UNITED STATES PATENT OFFICE.

DANIEL C. YATES, OF BIG LICK, VIRGINIA.

IMPROVEMENT IN COMPOUNDS FOR PRESERVING TOMATOES.

Specification forming part of Letters Patent No. 119,214, dated September 19, 1871.

*To all whom it may concern:*

Be it known that I, DANIEL C. YATES, of Big Lick, in the county of Roanoke and in the State of Virginia, have invented certain new and useful Improvements in Compound for Preserving Tomatoes and other Fruit; and do hereby declare that the following is a full, clear, and exact description thereof.

My compound is composed of rain-water, vinegar, and alum in about the following proportions, namely: Two-thirds rain-water, one-third vinegar, and a quarter pound of alum to each gallon of vinegar. This compound or liquid is placed in a suitable vessel and the tomatoes immersed therein. The tomatoes should be gathered with the skin or peeling unbroken, and with about one inch of the stem to each tomato. They are to be kept completely submerged in the liquid, and will keep fresh for any length of time. They may be kept in this manner for family use, or prepared in the same manner for transportation.

I do not confine myself to the exact proportions above given, as they may perhaps be varied for different kinds of fruit or different qualities of tomatoes.

Having thus fully described my invention, what I claim as new, and desire to secure by Letters Patent, is—

The within-described preserving compound, consisting of rain-water, vinegar, and alum, substantially as herein set forth.

In testimony that I claim the foregoing I have hereunto set my hand this 3d day of July, 1871.

DANIEL C. YATES.

Witnesses:
I. W. NEAL,
R. B. MOORMAN.

(34.)